US011997507B2

(12) United States Patent
Wai et al.

(10) Patent No.: US 11,997,507 B2
(45) Date of Patent: May 28, 2024

(54) PERSPECTIVE DETERMINATION METHOD, PERSPECTIVE DETERMINATION APPARATUS AND PROGRAM

(71) Applicant: NIPPON TELEGRAPH AND TELEPHONE CORPORATION, Tokyo (JP)

(72) Inventors: Shuki Wai, Musashino (JP); Tatsuhiko Iwakuni, Musashino (JP); Hideyuki Tsuboi, Musashino (JP); Daisei Uchida, Musashino (JP); Hideki Toshinaga, Musashino (JP); Kazuto Goto, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 151 days.

(21) Appl. No.: 17/786,001

(22) PCT Filed: Dec. 18, 2019

(86) PCT No.: PCT/JP2019/049639
§ 371 (c)(1),
(2) Date: Jun. 16, 2022

(87) PCT Pub. No.: WO2021/124484
PCT Pub. Date: Jun. 24, 2021

(65) Prior Publication Data
US 2023/0020465 A1 Jan. 19, 2023

(51) Int. Cl.
H04W 16/18 (2009.01)
H04B 17/391 (2015.01)
(52) U.S. Cl.
CPC .......... H04W 16/18 (2013.01); H04B 17/391 (2015.01); H04B 17/3912 (2015.01)

(58) Field of Classification Search
CPC .. H04W 16/18; H04B 17/391; H04B 17/3912
See application file for complete search history.

(56) References Cited

U.S. PATENT DOCUMENTS

| 8,400,448 B1* | 3/2013 | Doyle, Jr. | G06T 15/04 |
| | | | 345/419 |
| 2004/0248521 A1* | 12/2004 | Moursund | H04W 16/18 |
| | | | 455/67.14 |
| 2017/0142405 A1* | 5/2017 | Shors | G01C 11/04 |

FOREIGN PATENT DOCUMENTS

| JP | 20151901 A | 1/2015 |
| JP | 2015232513 A | 12/2015 |

OTHER PUBLICATIONS

Telecom Infra Project focuses on millimeter wave for dense networks, Image courtesy of the Telecom Infra Project, RCR Wireless News, Intelligence on all things wireless, Sep. 13, 2017, https://www.rcrwireless.com/20170913/carriers/telecom-intra-project-millimeter-wave-tag17.

(Continued)

Primary Examiner — Natasha W Cosme
(74) Attorney, Agent, or Firm — Harness, Dickey & Pierce, P.L.C.

(57) ABSTRACT

A line-of-sight determination method includes: a point cloud data acquisition step of acquiring point cloud data including a first position indicating a position of a first wireless station and a plurality of second positions indicating positions on a structure serving as a candidate in which a second wireless station opposing the first wireless station is to be installed; and a line-of-sight determination step of determining whether or not there is a line of sight between the first position and at least one of the second positions, and determining whether or not there is a line of sight between the first wireless station and the structure based on the determination result. In the line-of-sight determination step, (Continued)

if it has been determined that there is no line of sight between the first position and a first second position of the second positions, it is not determined whether or not there is a line of sight between the first position and a second second position among the second positions, the second second position being located in the vicinity of the first second position.

8 Claims, 7 Drawing Sheets

(56) References Cited

OTHER PUBLICATIONS

Frederic Lardinois, Facebook-backed Telecom Infra Project adds a new focus on millimeter wave tech for 5G, TechCrunch, Sep. 13, 2017, https://techcrunch.com/2017/09/12/facebook-backed-telecom-infra-project-adds-a-new-focus-on-millimeter-wave-tech-for-5g/?renderMode=ie11.

Jamie Davies, DT and Facebook TIP the scales for mmWave, telecoms.com, Sep. 12, 2017, http://telecoms.com/484622/dt-and-facebook-tip-the-scales-for-mmwave/.

Esri Japan Corporation, Outlook analysis-Visibility analysis-GIS basic explanation, esri Japan, Nov. 13, 2019 (Reading Day), https://www.esrij.com/gis-guide/spatial/visibility-analysis.

Kouji Oomori and Hiroyuki Suehisa, Infrastructure maintenance supported by MMS with high-density laser scanner, Photogrammetry and remote sensing, vol. 52, No. 6, 2013, https://www.jstage.jst.go.jp/article/jsprs/52/6/52_278/_pdf.

Asia Air Survey Co., Ltd., MMS point cloud data, G Spatial Information Center, Dec. 9, 2019 (Reading Day), https://www.geospatial.jp/ckan/dataset/mms.

* cited by examiner

PERSPECTIVE DETERMINATION METHOD, PERSPECTIVE DETERMINATION APPARATUS AND PROGRAM

CROSS-REFERENCE TO RELATED APPLICATIONS

This application is a 371 U.S. National Phase of International Application No. PCT/JP2019/049639, filed on Dec. 18, 2019. The entire disclosure of the above application is incorporated herein by reference.

TECHNICAL FIELD

The present invention relates to a line-of-sight determination method, a line-of-sight determination apparatus, and a program.

BACKGROUND ART

A use case for millimeter-wave band high-speed wireless communication has been indicated by mmWave Networks in the Telecom Infra Project (TIP). TIP is a consortium that promotes open specifications for all network devices. Also, mmWave Networks is one of the project groups of the TIP. mmWave Networks shows a use case in which millimeter-wave band high-speed wireless communication is performed between a wireless base station installed on a utility pole or the like and a wireless terminal station installed on a wall surface or the like of a structure such as a house or a building (hereinafter referred to as a "building or the like") (see NPL 1 to NPL 3).

By using the millimeter-wave band, which is an unlicensed band, mmWave Networks aims to make it possible to construct a network faster and cheaper than constructing a network by laying optical fibers. In order to realize such fast and cheap network construction, a station placement design method is required which minimizes the number of wireless base stations to be installed while accommodating the wireless terminal stations installed in all of the buildings and the like that are present in a service provision area (e.g., a residential area, etc.).

As the above-described station placement design method, for example, there are the following methods. First, an installation position candidate (e.g., a utility pole, an electric wire, etc.) of a certain wireless base station is selected. Next, assuming that the wireless base station is installed at the selected installation position candidate, all buildings or the like that are present at a position at which it is possible to communicate with the wireless base station are detected as buildings or the like in which the wireless terminal station can be installed. Note that a building or the like that is present at a position at which communication with the wireless base station is possible is a building in which the reception power that is needed for performing wireless communication with the wireless base station is ensured at at least one location on, for example, a wall surface of the building or the like. Also, detection of the buildings or the like that are present at positions where communication with the wireless base station is possible is performed with consideration given also to cases where traffic of electromagnetic waves is hindered by an obstruction that is present between the wireless base station and the building or the like.

Detection of buildings or the like that are present at positions where communication with the above-described wireless base station is possible is performed for each of a plurality of candidate positions of the wireless base station. This makes it possible to create a model as a combination problem for minimizing the number of wireless base stations to be installed. Then, by solving this combination problem, it is possible to design a station placement in which the number of wireless base stations is minimized while accommodating wireless terminal stations installed in all buildings or the like in the service provision area. Note that as described above, the candidate installation position of the wireless base station is assumed to be, for example, on a utility pole, on an electric wire connecting utility poles, and the like, and the candidate installation position of the wireless terminal station is assumed to be, for example, a wall surface or the like of a building or the like.

Incidentally, electromagnetic waves in the millimeter-wave band generally have a characteristic of having stronger straightness than electromagnetic waves in the microwave band. For this reason, in the case of electromagnetic waves in the millimeter-wave band, if there is no linear line of sight between two opposing wireless stations, the reception power will drop significantly. Accordingly, in station placement design for millimeter-wave band high-speed wireless communication in particular, it is important to more accurately determine whether or not there is a line of sight between two opposing wireless stations.

For example, NPL 4 discloses a method of visibility analysis, which is an analysis technique for a group of high-rise buildings in an urban area. Visibility analysis is an analysis method that includes a secondary analysis method such as line-of-sight analysis, and is performed on three-dimensional data that includes a large amount of data indicating the outer shapes of buildings. For example, NPL 4 presents a technique relating to line-of-sight analysis in the case of distinguishing between a position that can be seen linearly without obstruction and a position that cannot be seen linearly without obstruction when looking out over a surrounding area from the roof of a certain building.

However, the actual electromagnetic waves do not propagate only on a linear path connecting the two opposing wireless stations, but propagate in an elliptical path region called a Fresnel zone. For this reason, in order to more accurately determine whether or not there is a line of sight between two opposing wireless stations with higher accuracy, it is necessary to determine whether or not there is a line of sight with consideration given to the influence of the obstruction that is present in the Fresnel zone.

An MMS (Mobile Mapping System) is a measurement system in which it is possible to acquire point cloud data indicating the outer shapes of structures such as houses and buildings, utility poles, street lights, trees, and the like. Using the three-dimensional point cloud data obtained by the MMS, for example, it is possible to detect bending of columnar structures (see PTL 1), detect thin linear objects such as electric wires and lead-in wires laid between utility poles (see PTL 2), and the like. In the field of wireless communication, the three-dimensional point cloud data obtained by the MMS can be used to, for example, determine whether or not there is a line of sight between the installation position candidates for two designated wireless stations with consideration given to the size, outer shape, orientation, and the like of an obstruction in the Fresnel zone. For example, according to the techniques described in NPL 5 and NPL 6, it is possible to acquire point cloud data indicating the outer shape of a building or the like with an accuracy in units of centimeters or millimeters.

If such three-dimensional point cloud data is used to determine whether or not there is a line of sight between the installation position candidates of a plurality of wireless stations, it is necessary to determine whether or not there is a line of sight for each combination of two opposing radio stations upon analyzing the point cloud data of all of the objects present within the Fresnel zone. For this reason, in such a case, a large amount of calculation time is required. Accordingly, in order to design a station placement within a realistic calculation time, it is necessary to, to the greatest extent possible, reduce the number of instances of determining whether or not there is a line of sight between installation position candidates for a plurality of wireless stations.

CITATION LIST

Patent Literature

[PTL 1] JP 2015-232513A
[PTL 2] JP 2015-1901A

Non-Patent Literature

[NPL 1] "Telecom Infra Project focuses on millimeter wave for dense networks—Millimeter Wave Networks Project Group eyes 60 GHz band," [online] RCR Wireless News, Intelligence on all things wireless, Image courtesy of the Telecom Infra Project, [searched on Dec. 9, 2019], Internet <https://www.rcrwireless.com/20170913/carriers/telecom-infra-project-millimeter-wave-tag17>
[NPL 2] "Facebook-backed Telecom Infra Project adds a new focus on millimeter wave tech for 5G," [online] TechCrunch, [searched on Dec. 9, 2019], Internet <https://techcrunch.com/2017/09/12/facebook-backed-telecom-infra-project-adds-a-new-focus-on-millimeter-wave-tech-for-5g>
[NPL 3] "DT and Facebook TIP the scales for mmWave," [online] GLOTEL AWARDS 2019, telecoms.com, [searched on Dec. 9, 2019], Internet <http://telecoms.com/484622/dt-and-facebook-tip-the-scales-for-mm-wave>
[NPL 4] "Line-of-Sight Analysis—Visibility Analysis—Explanation of GIS Fundamentals", [online] esri Japan, [searched on Dec. 9, 2019], Internet <https://www.esrij.com/gis-guide/spatial/visibility-analysis>
[NPL 5] "Maintenance and management of infrastructure supported by MMS equipped with high-density laser scanner", [online], [searched on Dec. 9, 2019], Internet <https://www.jstage.jst.go.jp/article/jsprs/52/6/52_278/pdf>
[NPL 6] "MMS Point Cloud Data", [online] G Spatial Information Center, Asia Air Survey Co., Ltd., [searched on Dec. 9, 2019], Internet <https://www.geospatial.jp/ckan/dataset/mms>

SUMMARY OF THE INVENTION

Technical Problem

As described above, in general, a large amount of calculation time is needed for the determination of whether or not there is a line of sight between a plurality of installation position candidates for wireless stations, and therefore it is necessary to reduce the number of instances of that determination as much as possible. For that reason, for example, there is a need for technology that can detect combinations that are determined as having a line of sight more quickly from among combinations of an installation position candidate of a wireless base station and a plurality of installation position candidates in a building or the like (e.g., on a wall surface) where a wireless terminal station opposing the wireless base station can be installed.

The Fresnel zone radius of the Fresnel zone in the millimeter-wave band is, for example, about 25 [cm] at most when transmitting a distance of 50 [m] using electromagnetic waves in the 60 [GHz] band. Also, the sizes of objects (e.g., structures such as houses and buildings, fences, signboards, utility poles, trees, etc.) that are assumed to be obstructions that are present in a general urban area are often generally quite larger than the above-mentioned Fresnel zone radius. For this reason, if it is determined that there is no line of sight between a certain installation position candidate among a plurality of installation position candidates for a wireless terminal station in a building or the like (e.g., on a wall surface) and the installation position of the wireless base station, it can be said that there is a high likelihood that it will be determined that there is no line of sight between the other installation position candidates present in the vicinity of the installation position candidate, and the installation position of the wireless base station.

As a method for selecting an installation position candidate that is a target to be subjected to determination of whether or not there is a line of sight from among a plurality of installation position candidates of a wireless terminal station, for example, a method of selecting installation position candidates in order starting from the position of the end of the wall surface of a building or the like on which the wireless terminal station can be installed, a method of randomly selecting any installation position candidate on the wall surface, and the like are conceivable. However, with the method of selecting the installation position candidates in order starting from the position of the end of the wall surface, there is a high likelihood that it will be continuously determined that there is no line of sight, especially if the size of an obstruction that is present between the wireless base station and the building is relatively large. Also, even with the method in which any installation position candidate on the wall surface is randomly selected, if another installation position candidate located in the vicinity of an installation position candidate that has already been determined to have no line of sight is selected, there is a high likelihood that it will be determined that there is no line of sight.

Thus, conventionally, there has been a problem in that it is difficult to efficiently detect a combination of installation position candidates of two wireless stations that are determined as having a line of sight. As a result, for example, there has been a problem in that it is difficult to efficiently determine whether or not there is a line of sight between a wireless base station and a building or the like where a wireless terminal station can be installed.

The present invention has been made in view of the above points, and an object of the present invention is to provide a technique according to which it is possible to efficiently determine whether or not there is a line of sight.

Means for Solving the Problem

One aspect of the present invention is a line-of-sight determination method including: a point cloud data acquisition step of acquiring point cloud data including a first position indicating a position of a first wireless station and a plurality of second positions indicating positions on a structure serving as a candidate in which a second wireless station opposing the first wireless station is to be installed; and a line-of-sight determination step of determining whether or not there is a line of sight between the first position and at least one of the second positions, and determining whether or not there is a line of sight between the first wireless station and the structure based on the determination result, in which in the line-of-sight determination step, if it has been determined that there is no line of sight between the first position and a first second position among the second positions, it is not determined whether or not there is a line of sight between the first position and a second second position among the second positions, the second second position being located in the vicinity of the first second position.

Also, one aspect of the present invention is a line-of-sight determination apparatus including: a point cloud data acquisition unit configured to acquire point cloud data including a first position indicating a position of a first wireless station and a plurality of second positions indicating positions on a structure serving as a candidate in which a second wireless station opposing the first wireless station is to be installed; and a line-of-sight determination unit configured to determine whether or not there is a line of sight between the first position and at least one of the second positions, and determine whether or not there is a line of sight between the first wireless station and the structure based on the determination result, in which if it has been determined that there is no line of sight between the first position and a first second position among the second positions, the line-of-sight determination unit does not determine whether or not there is a line of sight between the first position and a second second position among the second positions, the second second position being located in the vicinity of the first second position.

Also, one aspect of the present invention is a program for causing a computer to execute the above-described line-of-sight determination method.

Effects of the Invention

According to the present invention, it is possible to improve the efficiency of determining whether or not there is a line of sight.

DESCRIPTION OF EMBODIMENTS

Figure 1:
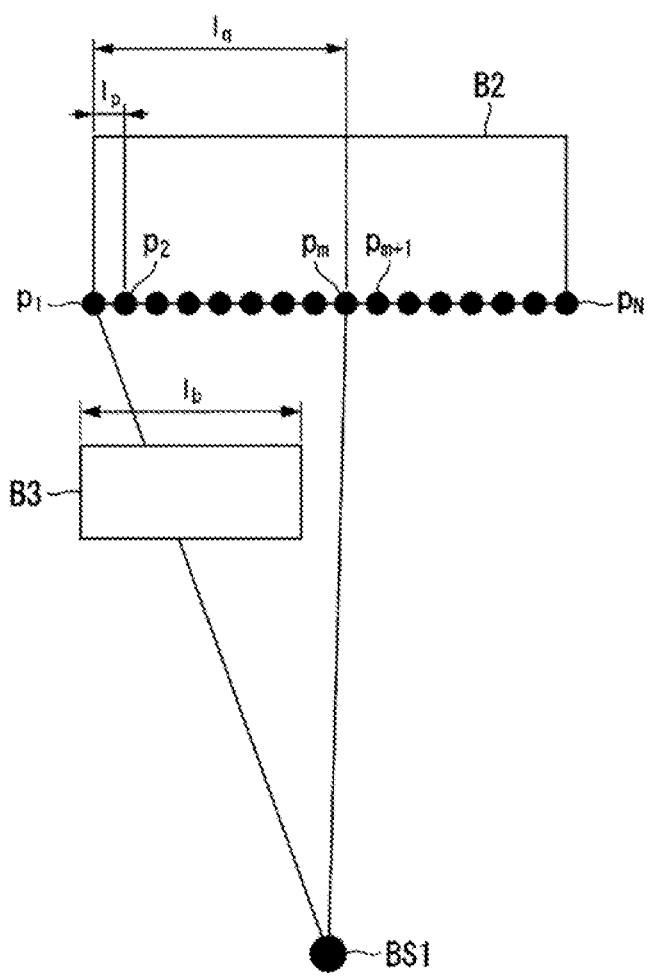
FIG. 1 is a schematic diagram showing line-of-sight determination performed by a line-of-sight determination apparatus according to a first embodiment of the present invention.

Hereinafter, a line-of-sight determination method, a line-of-sight determination apparatus, and a program according to an embodiment of the present invention will be described with reference to the drawings.

As a premise, a line-of-sight determination apparatus 1 in each embodiment described hereinafter aims to quickly determine whether or not there is a line of sight in the traffic of electromagnetic waves for wireless communication, between a wireless base station installation position candidate (e.g., a utility pole, etc.) of a wireless base station and a building or the like that is an installation position candidate of a wireless terminal station. The line-of-sight determination processing performed by the line-of-sight determination apparatus 1 is basically performed in the following flow.

First, the line-of-sight determination apparatus 1 selects any installation position candidate from among a plurality of installation position candidates for a wireless base station. Next, the line-of-sight determination apparatus 1 determines whether or not there is a line of sight between the selected installation position candidate of the wireless base station and each building or the like that is present within a service provision region (e.g., a residential area, etc.).

However, in a building or the like (for example, on a wall surface of a building or the like), there are a plurality of installation position candidates at which a wireless terminal station can be installed. The line-of-sight determination apparatus 1 determines whether or not there is a line of sight between the installation position candidate of the wireless base station and at least one installation position candidate among the plurality of installation position candidates in the building or the like (e.g., on the wall surface). Based on the determination result, the line-of-sight determination apparatus 1 determines whether or not there is a line of sight between the above-selected wireless base station installation position candidate and each building or the like.

Here, the line-of-sight determination apparatus 1 determines that there is a line of sight between an installation position candidate or the wireless base station and the building or the like if at least one of the plurality of installation position candidates determined as having a line of sight is present in a certain building or the like. On the other hand, the line-of-sight determination apparatus 1 determines that there is no line of sight between the installation position candidate of the wireless base station and the building or the like if it is determined that there is no line of sight between the above-described plurality of installation position candidates and the installation position candidate of the wireless base station in a certain building or the like. By performing such a determination, the line-of-sight determination apparatus 1 can prevent erroneous determination that there is no line of sight between the installation position candidate of the wireless base station and the building or the like even though there is at least one installation position candidate that has a line of sight with the installation position candidate of the wireless base station among the plurality of installation position candidates for the wireless terminal station.

The line-of-sight determination apparatus 1 determines whether or not there is the above-mentioned line of sight for each building or the like for all installation position candidates for the wireless base station. As a result, the line-of-sight determination apparatus 1 can distinguish between a building or the like with a line of sight and a building or the like without a line of sight for each installation position candidate of the wireless base station. Then, by solving the combination problem using the above-mentioned result of determining whether or not there is a line of sight obtained for each installation position candidate of the wireless base station, the line-of-sight determination apparatus 1 performs station placement design in which the installation position of the wireless base station is determined so as to minimize the number of wireless base stations while making it possible to accommodate all of the buildings and the like in the service providing area.

First Embodiment

Hereinafter, a first embodiment of the present invention will be described.

FIG. 1 is a schematic view showing line-of-sight determination performed by the line-of-sight determination apparatus 1 according to the first embodiment of the present invention.

First, the line-of-sight determination apparatus 1 selects any installation position candidate BS1 of the wireless base station (hereinafter, simply referred to as "wireless base station BS1") from among a plurality of installation position candidates of the wireless base station, which are present in the service provision area. In addition, the line-of-sight determination apparatus 1 selects a building or the like (hereinafter, simply referred to as "building B2") that is a target to be subjected to the determination of whether or not there is a line of sight from among a plurality of buildings or the like that are present in the service provision area (e.g., in a residential area). The line-of-sight determination apparatus 1 determines whether or not there is a line of sight between the wireless base station BS1 and the building B2.

FIG. 1 shows an example of a case of looking down on the wireless base station BS1, the building B2, and an obstruction B3 from directly above. As shown in FIG. 1, in the building B2 (e.g., on a wall surface thereof), there are N installation candidate points $p_n$ (n=1, 2, . . . , N), which are installation position candidates for the wireless terminal station. The N installation candidate points $p_n$ are arranged in a horizontal row at equal intervals, for example. The line-of-sight determination apparatus 1 first determines whether or not there is a line of sight between the wireless base station BS1 and an installation candidate point $p_1$ on the leftmost end in the building B2. As shown in FIG. 1, there is an obstruction B3 between the wireless base station BS1 and the installation candidate point $p_1$. Accordingly, the line-of-sight determination apparatus 1 determines that there is no line of sight between the wireless base station BS1 and the installation candidate point $p_1$.

In such a case, in general, the line-of-sight determination apparatus often sets an installation candidate point $p_2$ adjacent to the installation candidate point $p_1$ (located one to the right of the installation candidate point $p_1$ in FIG. 1) as the next determination target and performs determination of whether or not there is a line of sight between the wireless base station BS1 and the installation candidate point $p_2$. However, the setting interval of the point cloud data such as the installation candidate point $p_n$ is commonly an interval in units of centimeters or millimeters. In contrast to this, the width of the obstruction B3 is commonly a length in units of meters in many cases. That is, if the interval between two adjacent installation candidate points $p_n$ is $l_p$ and the width of the obstruction B3 is $l_b$, the relationship between $l_p$ and $l_b$ is expressed by the following equation (1).

[Math. 1]

$$l_p \ll l_b \quad (1)$$

In this manner, the width $l_b$ of the obstruction B3 is relatively quite wide compared to the interval $l_p$ between two adjacent installation candidate points $p_n$. For this reason, if it is determined that there is no line of sight between the wireless base station BS1 and the installation candidate point $p_1$, it can be said that there is a very high likelihood that it will be determined that there is similarly no line of sight between the wireless base station BS1 and the installation candidate point $p_2$ (which is located in the vicinity of the installation candidate point $p_1$) as well.

Note that in general, the width $l_b$ of the obstruction B3 is unknown, and in actuality, the width $l_b$ may not necessarily be much wider than the above interval $l_p$. However, in order to specify the width $l_b$ of the obstruction B3, it is easily expected that analysis of a large number of pieces of point cloud data will be required and a huge amount of calculation time will be required. Thus, in the present embodiment, the width $l_b$ of the obstruction B3 is not specified.

The line-of-sight determination apparatus 1 in the present embodiment holds in advance a value of the separation distance $l_q$ that satisfies the following equation (2).

[Math. 2]

$$l_p < l_q \quad (2)$$

For example, if it is determined that there is no line of sight between the wireless base station BS1 and the installation candidate point $p_1$, the line-of-sight determination apparatus 1 similarly assumes that there is no line of sight with the wireless base station BS1 also for another installation candidate point $p_n$ present at a position for which the distance from the installation candidate point $p_1$ is within the separation distance $l_w$. In the example shown in FIG. 1, if it is determined that there is no line of sight between the wireless base station BS1 and the installation candidate point $p_1$, the line-of-sight determination apparatus 1 assumes that there is no line of sight also between the wireless base station BS1 and each of the installation candidate points $p_2$ to $p_m$. Then, for example, the line-of-sight determination apparatus 1 sets an installation candidate point $p_{m+1}$ having the shortest distance from the installation candidate point $p_1$ among the installation candidate points $p_n$ present at a position where the distance from the installation candidate point $p_1$ is farther than the separation distance $l_q$ as the next determination target and performs determination of whether or not there is a line of sight between the wireless base station BS1 and the installation candidate point $p_{m+1}$.

Thus, the line-of-sight determination apparatus 1 in the first embodiment excludes another installation candidate point $p_n$ that is present at a position with the separation distance $l_q$ from the installation candidate point $p_n$ for which it was determined that there is no line of sight with the wireless base station BS1, from the targets to be subjected to determination of whether or not there is a line of sight. For this reason, the line-of-sight determination apparatus 1 can reduce the number of instances of performing processing for determining whether or not there is a line of sight for the installation candidate points $p_n$ that are highly likely to be determined to have no line of sight.

Note that the subsequent operations of the line-of-sight determination apparatus 1 will be described in more detail later with reference to the flowchart.

Configuration of Line-of-Sight Determination Apparatus

Hereinafter, the functional configuration of the line-of-sight determination apparatus 1 will be described.

Figure 2:
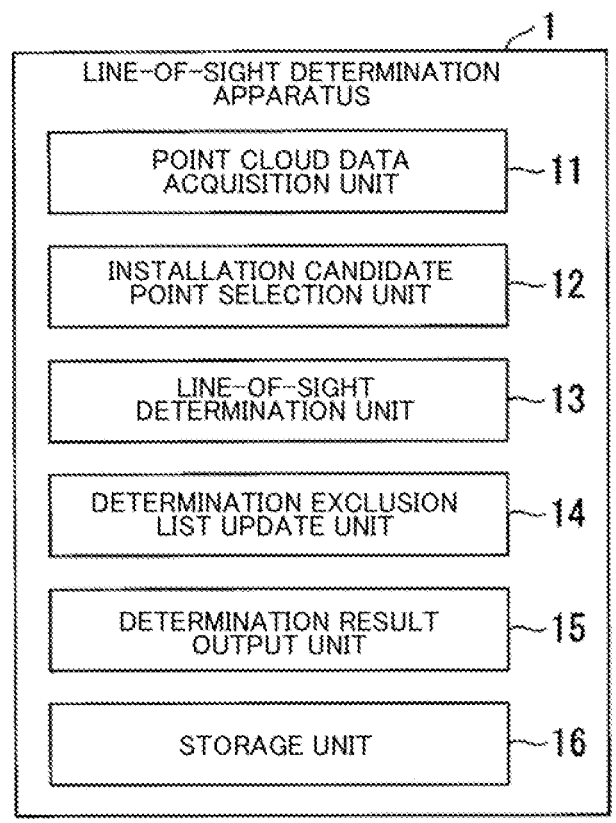
FIG. 2 is a block diagram showing a functional configuration of a line-of-sight determination apparatus according to the first embodiment of the present invention.

FIG. 2 is a block diagram showing a functional configuration of the line-of-sight determination apparatus 1 according to the first embodiment of the present invention.

The line-of-sight determination apparatus 1 is, for example, an information processing device such as a general-purpose computer. As shown in FIG. 2, the line-of-sight determination apparatus 1 is constituted by including a point cloud data acquisition unit 11, an installation candidate point selection unit 12, a line-of-sight determination unit 13, a determination exclusion list update unit 14, a determination result output unit 15, and a storage unit 16.

From, for example, an external device or the like, the point cloud data acquisition unit 11 acquires point cloud data including a plurality of installation position candidates (first positions) for the wireless base station (first wireless station) and a plurality of installation candidate positions (second positions) of a candidate building or the like (on a structure) in which a wireless terminal station (second wireless station) opposing the wireless base station is to be installed. The external device in this context is a device such as an MMS that can acquire point cloud data indicating the positions and shapes of objects in the surrounding area using, for example, a laser scanner or the like. The point cloud data acquisition unit 11 stores the acquired point cloud data in the storage unit 16.

The installation candidate point selection unit 12 selects an installation position candidate that is a target to be subjected to the determination of whether or not there is a line of sight from among a plurality of installation position candidates of the wireless base station, which are included in the point cloud data stored in the storage unit 16. Also, the installation candidate point selection unit 12 selects information indicating a building or the like that is a target to be subjected to the determination of whether or not there is a line of sight, from among information indicating a plurality of buildings or the like, which is included in the point cloud data stored in the storage unit 16. Also, the installation candidate point selection unit 12 selects an installation position candidate that is a target to be subjected to the determination of whether or not there is a line of sight, from among the plurality of installation candidate positions of the wireless terminal station in the selected building or the like (e.g., on the wall surface thereof). The installation candidate point selection unit 12 outputs information indicating the selection result to the line-of-sight determination unit 13.

The line-of-sight determination unit 13 acquires information indicating the installation position candidates of the wireless base station, the building or the like, and the installation position candidates of the wireless terminal station, which are selected by the installation candidate point selection unit 12 and that are targets to be subjected to the determination of whether or not there is a line of sight. The line-of-sight determination unit 13 determines whether or not there is a line of sight between the installation position candidate (first position) of the wireless base station and at least one installation position candidate (second position) of the wireless terminal station. The line-of-sight determination unit 13 determines whether or not there is a line of sight between the wireless base station (first wireless station) and the building or the like (structure) based on the determination result. The line-of-sight determination unit 13 outputs information indicating the determination result to the determination result output unit 15.

Also, if it is determined that there is no line of sight between the installation position candidate of the wireless base station (first position) and the installation position candidate of a certain wireless terminal station (first second position), the line-of-sight determination unit 13 outputs, to the determination exclusion list update unit 14, information indicating another installation position candidate (second second position) of the wireless terminal station located in the vicinity (that is, located within the separation distance $l_q$) of the above-mentioned certain installation position candidate (first second position) of the wireless terminal station. Then, the line-of-sight determination unit 13 does not determine whether or not there is a line of sight between the installation position candidate (second second position) of the wireless terminal station included in the determination exclusion list and the installation position candidate (first position) of the wireless base station.

Also, if there is at least one installation position candidate that has been determined as having a line of sight among a plurality of installation position candidates of the wireless terminal station in a certain building or the like, the line-of-sight determination unit 13 determines that there is a line of sight between the installation position candidate of the wireless base station and that building or the like. On the other hand, if it is determined that there is no line of sight between the plurality of installation position candidates of the wireless terminal station and the installation position candidate of the wireless base station in a certain building or the like, the line-of-sight determination unit 13 determines that there is no line of sight between the installation position candidate of the wireless base station and the building or the like.

The determination exclusion list update unit 14 acquires the information that was output from the line-of-sight determination unit 13 and indicates another installation position candidate of the wireless terminal station that is located in the vicinity of the installation position candidate of the wireless terminal station determined to have no line of sight. The determination exclusion list update unit 14 adds the acquired information indicating the other installation position candidate of the wireless terminal station to the determination exclusion list stored in the storage unit 16.

The determination result output unit 15 acquires information indicating the determination result output from the line-of-sight determination unit 13. The determination result output unit 15 outputs information indicating the acquired determination result. For example, the determination result output unit 15 outputs a determination result indicating that there is a line of sight between the installation position candidate of the wireless base station and the building or the like. That is, a determination result is output which indicates that a wireless terminal station can be installed in the building or the like if the wireless base station is installed at the installation position candidate of the wireless base station. Alternatively, for example, the determination result output unit 15 outputs a determination result indicating that there is no line of sight between the installation position candidate of the wireless base station and the building or the like. That is, a determination result is output which indicates that a wireless terminal station cannot be installed in the building or the like if the wireless base station is installed at the installation position candidate of the wireless base station.

Note that, for example, the determination result output unit 15 may also be configured to include a communication interface and output information indicating the determination result to, for example, an external device. Alternatively, for example, the determination result output unit 15 may also be configured to include a display device such as a liquid crystal display and output the determination result by displaying on the display device.

The storage unit 16 stores the point cloud data acquired by the point cloud data acquisition unit 11. Also, the storage unit 16 stores the determination exclusion list to be updated by the determination exclusion list update unit 14. Also, the storage unit 16 stores the separation distance $l_q$ or the separation angle $\theta_q$ according to a later-described fifth embodiment. The storage unit 16 may also store information indicating the width of the obstruction B3 obtained by analyzing the acquired point cloud data, information indicating the selection result of the selection performed by the installation candidate point selection unit 12, and information indicating the determination result of the determination performed by the line-of-sight determination unit 13.

Also, the storage unit 16 stores various types of data and programs to be used in each functional unit of the line-of-sight determination apparatus 1. For example, it is possible to use a configuration in which each of the above-mentioned functional units of the line-of-sight determination apparatus 1 operates due to various programs stored in the storage unit 16 being read and executed by a processor (not shown) such as a CPU (Central Processing Unit) included in the line-of-sight determination apparatus 1. Note that the storage unit 16 is constituted by including, for example, a storage medium such as a RAM (Random Access Memory; readable/writable memory), a flash memory, an EEPROM (Electrically Erasable Programmable Read Only Memory), an HDD (Hard Disk Drive), or any combination of these storage media.

Operations of Line-of-Sight Determination Apparatus

Hereinafter, an example of operations of the line-of-sight determination apparatus 1 will be described.

Figure 3:
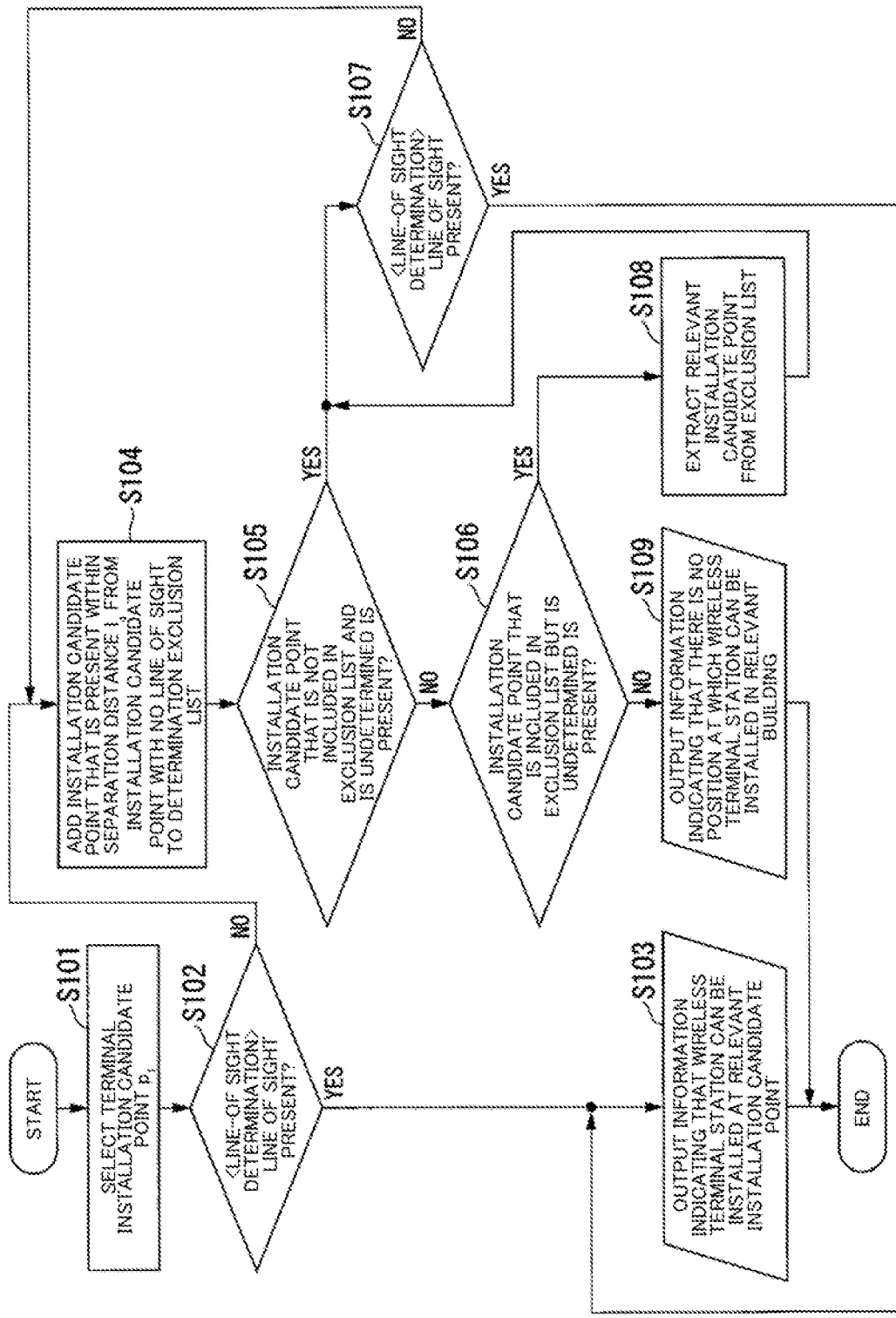
FIG. 3 is a flowchart showing operations of the line-of-sight determination apparatus according to the first embodiment of the present invention.

FIG. 3 is a flowchart showing operations of the line-of-sight determination apparatus 1 according to the first embodiment of the present invention.

The operations of the line-of-sight determination apparatus 1 shown in the flowchart of FIG. 3 are started when the point cloud data acquisition unit 11 acquires the point cloud data and stores the acquired point cloud data in the storage unit 16, and thereafter the installation candidate point selection unit 12 selects the installation position candidate of the wireless base station (position of the wireless base station BS1) and the building or the like (building B2) that is a target to be subjected to the determination of whether or not there is a line of sight. The point cloud data in this context is point cloud data that includes a plurality of installation position candidates of the wireless base stations (positions of the wireless base station BS1), which are present in the range of the service provision area, and a plurality of installation position candidates for the wireless terminal station in the plurality of buildings or the like (for example, on a wall surface thereof) (the installation candidate point $p_n$ in each building B2).

First, the installation candidate point selection unit 12 refers to the point cloud data stored in the storage unit 16 and selects the installation candidate point $p_1$ in the above-described selected building B2 (e.g., on a wall surface thereof) (step S101).

Next, the line-of-sight determination unit 13 determines whether or not there is a line of sight between the position of the wireless base station BS1 selected by the installation candidate point selection unit 12 and the installation candidate point $p_1$ (step S102). If the line-of-sight determination unit 13 determines that there is a line of sight between the position of the wireless base station BS1 and the installation candidate point $p_1$ (step S102, Yes), the determination result output unit 15 outputs information indicating that the wireless terminal station can be installed at the installation candidate point $p_1$ (step S103), and the operations of the line-of-sight determination apparatus 1 shown in the flowchart of FIG. 3 end. That is, a determination result indicating that there is a line of sight between the position of the selected wireless base station BS1 and the building B2 is output.

On the other hand, if the line-of-sight determination unit 13 determines that there is no line of sight between the position of the wireless base station BS1 and the installation candidate point $p_1$ (step S102, No), the determination exclusion list update unit 14 adds the other installation candidate point $p_n$ that is present at a position within the separation distance $l_q$ from the position of the installation candidate point $p_1$ to the determination exclusion list stored in the storage unit 16 (step S104).

Next, the installation candidate point selection unit 12 confirms whether or not there is an installation candidate point $p_n$ that is not included in the determination exclusion list stored in the storage unit 16 and for which determination of whether or not there is a line of sight has not been performed (step S105). If it is determined by the installation candidate point selection unit 12 that there is an installation candidate point $p_n$ that is not included in the determination exclusion list and for which the determination of whether or not there is a line of sight has not been performed (step S105, Yes), the line-of-sight determination unit 13 determines the line of sight between the position of the wireless base station BS1 and the installation candidate point $p_n$ (step S107).

If the line-of-sight determination unit 13 determines that there is a line of sight between the position of the wireless base station BS1 and the installation candidate point $p_n$ (step S107, Yes), the determination result output unit 15 outputs information indicating that the wireless terminal station can be installed at the installation candidate point $p_n$ (step S103), and the operations of the line-of-sight determination apparatus 1 shown in the flowchart of FIG. 3 end. That is, a determination result is output which indicates that there is a line of sight between the position of the selected wireless base station BS1 and the building B2.

On the other hand, if the line-of-sight determination unit 13 determines that there is no line of sight between the position of the wireless base station BS1 and the installation candidate point $p_n$ (step S107, No), the determination exclusion list update unit 14 adds information indicating another installation candidate point $p_n$ that is present at a position within the separation distance $l_q$ from the position of the installation candidate point $p_n$ to the determination exclusion list stored in the storage unit 16 (step S104).

On the other hand, if it has been determined by the installation candidate point selection unit 12 that there is no installation candidate point $p_n$ that is not included in the determination exclusion list and for which the determination of whether or not there is a line of sight has not been performed (step S105, No), the installation candidate point selection unit 12 checks whether or not there is an installation candidate point $p_n$ that is included in the determination exclusion list and for which the determination of whether or not there is a line of sight has been performed (step S106).

If it has been determined by the installation candidate point selection unit 12 that there is an installation candidate point $p_n$ that is included in the determination exclusion list and for which the determination of whether or not there is a line of sight has not been performed (step S106, Yes), the determination exclusion list update unit 14 extracts the information indicating the installation candidate point $p_n$ from the determination exclusion list stored in the storage unit 16 (step S108). Next, the line-of-sight determination unit 13 determines the line of sight between the position of the wireless base station BS1 and the installation candidate point $p_n$ extracted above (step S107).

If it has been determined by the line-of-sight determination unit 13 that there is a line of sight between the position of the wireless base station BS1 and the installation candidate point $p_n$ extracted above (step S107, Yes), the determination result output unit 15 outputs information indicating that the wireless terminal station can be installed at the installation candidate point $p_n$ extracted above (step S103), and the operations of the line-of-sight determination apparatus 1 shown in the flowchart of FIG. 3 end. That is, a determination result is output which indicates that there is a line of sight between the position of the selected wireless base station BS1 and the building B2.

On the other hand, if it has been determined by the line-of-sight determination unit 13 that there is no line of sight between the position of the wireless base station BS1 and the installation candidate point $p_n$ extracted above (step S107, No), the determination exclusion list update unit 14 adds information indicating another installation candidate point $p_n$ that is present at a position within the separation distance $l_q$ from the position of the installation candidate point $p_n$ extracted above to the determination exclusion list stored in the storage unit 16 (step S104).

On the other hand, if it is determined by the installation candidate point selection unit 12 that there is no installation candidate point $p_n$ that is included in the determination exclusion list and for which the determination of whether or not there is a line of sight has not been performed (step S106, No), it is determined that there is no line of sight between the positions of the wireless base station BS1 and all of the installation candidate points $p_n$ of the building B2. In this case, the determination result output unit 15 outputs information indicating that there is no position at which the wireless terminal station can be installed in the building B2 selected as the target to be subjected to the determination of whether or not there is a line of sight (step S109), and the operations of the line-of-sight determination apparatus 1 indicated by the flowchart in FIG. 3 end. That is, a determination result is output which indicates that there is no line of sight between the position of the selected wireless base station BS1 and the building B2.

Note that in an example, as shown in FIG. 1, the line-of-sight determination apparatus 1 according to the present embodiment starts processing for determining whether or not there is a line of sight from the installation candidate point $p_1$ located at an end portion of the building B2, and determines whether or not there is a line of sight in order starting from the installation candidate point $p_n$ with a closer distance to the installation candidate point $p_1$ (while excluding the installation candidate points $p_n$ included in the determination exclusion list from the determination targets). For example, the line-of-sight determination apparatus 1 determines whether or not there is a line of sight in the following order: installation candidate point $p_1$, installation candidate point $p_2$, installation candidate point $p_3$, ..., and installation candidate point $p_N$. However, the configuration is not limited to this kind of configuration, and for example, the line-of-sight determination apparatus 1 may also be configured to randomly select one installation candidate point $p_n$ as a determination target each time from among the N installation candidate points $p_n$.

Note that as shown in the flowchart of FIG. 3, in some cases, the line-of-sight determination apparatus 1 according to the present embodiment extracts an installation candidate point $p_n$ that is included in the exclusion list and for which the determination of whether or not there is a line of sight has not been performed, and determines whether or not there is a line of sight. That is, if there is no installation candidate point $p_n$ that has been determined as having a line of sight among the installation candidate points $p_n$ that are not included in the determination exclusion list, next, the line-of-sight determination apparatus 1 determines whether or not there is a line of sight using all of the N installation candidate points $p_n$ as the determination targets.

However, the present invention is not limited to such a configuration, and for example, the line-of-sight determination apparatus 1 may also be configured to omit the operation of step S106 of the flowchart shown in FIG. 3 in order to speed up the determination of whether or not there is a line of sight for each building B2, whereby the installation candidate point $p_n$ is not extracted from the determination exclusion list. That is, the line-of-sight determination apparatus 1 may also deem that there is similarly no line of sight between the candidate position of the wireless base station and another installation candidate point $p_n$ located in the vicinity (within the separation distance $l_q$) of the installation candidate point $p_n$ that has been determined as having no line of sight with the candidate position of the wireless base station.

Note that in this embodiment, in order to simplify the description, it is assumed that N installation candidate points $p_n$ are arranged linearly on a two-dimensional plane as shown in FIG. 1. However, in actuality, the installation candidate point $p_n$ generally exists in a three-dimensional space. However, even in such a case, as described above, the line-of-sight determination apparatus 1 may sequentially select the installation candidate points $p_n$ that are closer, or may randomly select one installation candidate point $p_n$ each time.

Even if the installation candidate point $p_n$ is present in a three-dimensional space, according to the line-of-sight determination apparatus 1 in the present embodiment, other installation candidate points $p_n$ that are present in the vicinity of the installation candidate point $p_n$ that has been determined as having no line of sight are less likely to be selected as targets to be subjected to the determination of whether or not there is a line of sight, and therefore the determination of whether or not there is a line of sight between the position of the wireless base station BS1 and the building B2 is made more efficient.

Second Embodiment

Hereinafter, a second embodiment of the present invention will be described.

The free-space propagation loss of wireless electromagnetic wave propagation is proportional to the square of the frequency. For this reason, there is a problem in that the range reached by the electromagnetic waves (hereinafter referred to as "coverage") becomes narrow, especially in a high frequency band such as a millimeter-wave band. In contrast to this, it is conceivable to expand the coverage by narrowing the beam of the electromagnetic wave and increasing the gain. However, by simply increasing the gain, the coverage expands in only a specific direction. In view of this, by using a beamforming technique according to which it is possible to direct a beam in a plurality of directions, it is possible to emit an electromagnetic wave in any direction, and therefore coverage can be expanded in any direction.

However, the purpose of using beamforming is merely to compensate for the free space propagation loss in any direction. Accordingly, the desired range need only be covered by directing the radiation direction of the electromagnetic wave in each direction divided in equal intervals with an interval of about the beam width. That is, it is not necessary to control the emission direction of the electromagnetic wave with a particle size finer than this. For example, a configuration is common in which beamforming is performed by selecting from a limited number of beam direction candidates, such as performing beamforming in units of 3-dB beam widths and directing the beam in an overall desired direction, with an allowed power loss of 3 [dB].

If it has been determined that there is no line of sight between the installation position candidate of the wireless base station and one installation position candidate of the wireless terminal station within a specific beam range, it is thought that there is a high likelihood that it will be determined that there is similarly no line of sight between the installation position candidate of the wireless base station and the installation position candidate of another wireless terminal station that is present within the same beam range. This is because a plurality of installation position candidates that are present in the same beam range are located close to each other.

The line-of-sight determination apparatus 1 in the second embodiment sets the value of the separation distance $l_q$, which was set as a random value in the above-described first embodiment, to a value obtained based on the beam width. The value obtained based on the beam width is, for example, the value of the beam width itself, a value obtained by adding or subtracting a predetermined numeric value from the value of the beam width, or the like. As a result, the line-of-sight determination apparatus 1 can reduce the number of instances of performing the processing for determining whether or not there is a line of sight for the installation candidate position, which is likely to be determined as having no line of sight.

Third Embodiment

Hereinafter, a third embodiment of the present invention will be described.

In the above-described second embodiment, it is assumed that a configuration is used in which, in the beamforming performed by the wireless base station, a specific beam is selected from beam candidates directed in a plurality of emission directions set at intervals of about the beam width. Then, the value of the separation distance $l_q$ is set to a value obtained based on the beam width, and processing for determining whether or not there is a line of sight is performed.

On the other hand, the particle size of the beamforming performed by the wireless base station can be made even finer than the beam width. For example, in the case where there is an obstruction in the Fresnel zone, if there is an installation position candidate of the wireless terminal station that has been determined as having no line of sight due to the influence of the obstruction that is present in the Fresnel zone, it is thought that there is a high likelihood that it will be determined that there is similarly no line of sight also for another installation position candidate located in the vicinity of the installation position candidate.

The line-of-sight determination apparatus 1 in the third embodiment sets the value of the separation distance $l_q$, by which the value obtained based on the beam width is set in the above-described second embodiment, to a value obtained based on the Fresnel zone width. The value obtained based on the Fresnel zone width is, for example, the value of the Fresnel zone width itself, a value obtained by adding or subtracting a predetermined numeric value to or from the value of the Fresnel zone width, or the like.

Specifically, for example, the value of the Fresnel zone width $r_1$ [m], which is represented by the following equation (3) is set as the value of the above-described separation distance $l_q$. Then, if there is an installation position candidate of a wireless terminal station that has been determined as having no line of sight with the installation position candidate of the wireless base station due to the influence of an obstruction that is present in the Fresnel zone, the line-of-sight determination apparatus 1 does not perform the determination of whether or not there is a line of sight on another installation position candidate of the wireless terminal station located within the range of the Fresnel zone width $r_1$.

[Math. 3]

$$r_1 = \frac{\sqrt{\lambda d}}{2} \qquad (3)$$

Here, $\lambda$, represents the wavelength of an electromagnetic wave used for wireless communication. Also, d represents the distance between the wireless base station and the wireless terminal station. Note that the Fresnel zone width at this time is the radius at a distance d/2 at which the Fresnel zone radius is at its maximum, but it may also be the radius at a different position d'. This radius r2 is expressed by the following equation (4). When d'=d/2, r2=r1 is satisfied.

[Math. 4]

$$r_2 = \sqrt{\lambda \frac{d'(d-d')}{d}} \qquad (4)$$

According to the above-described configuration, the line-of-sight determination apparatus 1 can reduce the number of instances of performing processing for determining whether or not there is a line of sight for an installation candidate position that is highly likely to be determined as having no line of sight.

Fourth Embodiment

Hereinafter, a fourth embodiment of the present invention will be described.

In each of the above-described embodiments, in order to simplify the description, a configuration was used in which it is determined whether or not there is a line of sight using point cloud data on a two-dimensional plane. However, in actuality, three-dimensional point cloud data is commonly used. In general, the number of pieces of three-dimensional point cloud data is often very large. For this reason, it is thought that it may not be realistic to extract an object that serves as an obstruction from this large amount of point cloud data.

In contrast to this, for example, in general two-dimensional map data such as a vector map, by regarding a figure of a closed path such as a rectangle as a building or the like, it is possible to estimate the size of the building or the like. This makes it possible to identify the width of a building assumed to be an obstruction.

The line-of-sight determination apparatus 1 in the fourth embodiment sets the value of the separation distance $l_{c'}$ to a value obtained based on the width of the obstruction. The value obtained based on the width of the obstruction is, for example, the value of the width of the obstruction itself, or a value obtained by adding or subtracting a predetermined value to or from the value of the width of the obstruction.

As described above, the width of the obstruction is specified based on other map data such as a vector map. For example, the line-of-sight determination apparatus 1 identifies the minimum value $l_b$ of the width of the obstruction detected based on the other map data. Then, the line-of-sight determination apparatus 1 sets the value of the separation distance $l_q$ to the value of $l_b$.

According to the above-described configuration, the line-of-sight determination apparatus 1 can reduce the number of instances of performing processing for determining whether or not there is a line of sight for an installation candidate position that is likely to be determined as having no line of sight.

Fifth Embodiment

Hereinafter, a fifth embodiment of the present invention will be described.

Figure 4:
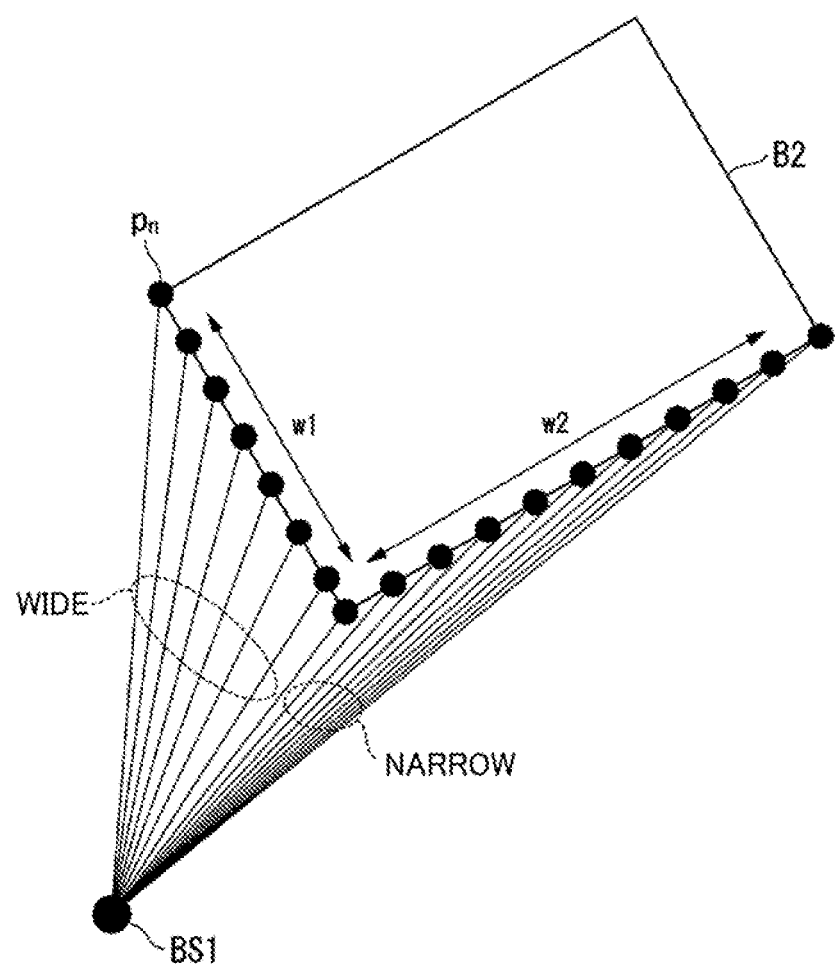
FIG. 4 is a schematic diagram showing line-of-sight determination performed by a line-of-sight determination apparatus according to a fifth embodiment of the present invention.

In each of the above-described embodiments, in order to simplify the description, a case has been described in which the direction of the building or the like (e.g., the wall surface thereof) is the direction of the wireless base station BS1 has been described. However, in actuality, as shown in FIG. 4, for example, a case is also conceivable in which two wall surfaces of the building B2 face direction that are at different angles with respect to the wireless base station BS1. In the example shown in FIG. 4, the angle between the orientation of the wall surface w1 of the building B2 and the direction of the wireless base station BS1 is smaller than the angle between the orientation of the wall surface w2 of the building B2 and the direction of the wireless base station BS1.

If the orientations of the wireless base station BS1 and the building B2 are as shown in FIG. 4, for example, when the intervals of the plurality of installation candidate points $p_n$ are set to equal intervals similarly to, for example, the above-described first embodiment, the angle interval of each installation candidate point $p_n$ viewed from the wireless base station BS1 varies. That is, the angle interval between the two adjacent installation candidate points $p_n$ located on the wall surface w1 of the building B2 as seen from the wireless base station BS1 is wider, and the angle interval between the two adjacent installation candidate points $p_n$ located on the wall surface w2 of the building B2 is narrower. Note that even if the installation candidate points $p_n$ are located on the same wall surface, the closer the installation candidate point $p_n$ is to the wireless base station BS1, the wider the angle interval is, and the farther the installation candidate point $p_n$ is from the wireless base station BS1, the narrower the angle interval is.

In such a case, if the separation distance $l_q$ is set according to the interval of the installation candidate points $p_n$ located on the wall surface w1 having a wider angle interval, the interval of a plurality of installation candidate points $p_n$ located on the wall surface w2 having a narrow angle interval will be too narrow when viewed from the wireless base station BS1. As a result, the number of instances of processing for determining whether or not there is a line of sight is increased, and thus an unnecessary calculation cost is generated. Conversely, if the separation distance $l_q$ is set according to the interval of the installation candidate points $p_n$ located on the wall surface w2 with the narrower angle interval, the interval of the plurality of installation candidate points $p_n$ located on the wall surface w1 with the wider angle interval will be too wide when viewed from the wireless base station BS1. As a result, there is a possibility that the installation candidate point $p_n$, which is determined as having a line of sight, will not be detected efficiently.

In contrast to this, in the line-of-sight determination apparatus 1 according to the fifth embodiment, the separation value used to determine whether or not to add, to the determination exclusion list, another installation position candidate of the wireless terminal station that is located in the vicinity of the installation position candidate of the wireless terminal station that has been determined as not having a line of sight with the candidate position of the wireless base station is defined not by the distance (separation distance $l_q$) as in the first embodiment described above, but by the angle (separation angle $\theta_q$).

If the interval $l_p$ of the adjacent installation candidate point $p_n$ has been converted into the angle seen from the wireless base station BS1, the angle $\theta_p$ is expressed by as in following equation (5).

[Math. 5]

$$\theta_p = \cos^{-1} \frac{\overrightarrow{p_i p_{BS1}} \cdot \overrightarrow{p_{i+1} p_{BS1}}}{|\overrightarrow{p_i p_{BS1}}||\overrightarrow{p_{i+1} p_{BS1}}|} \quad (5)$$

Figure 5:
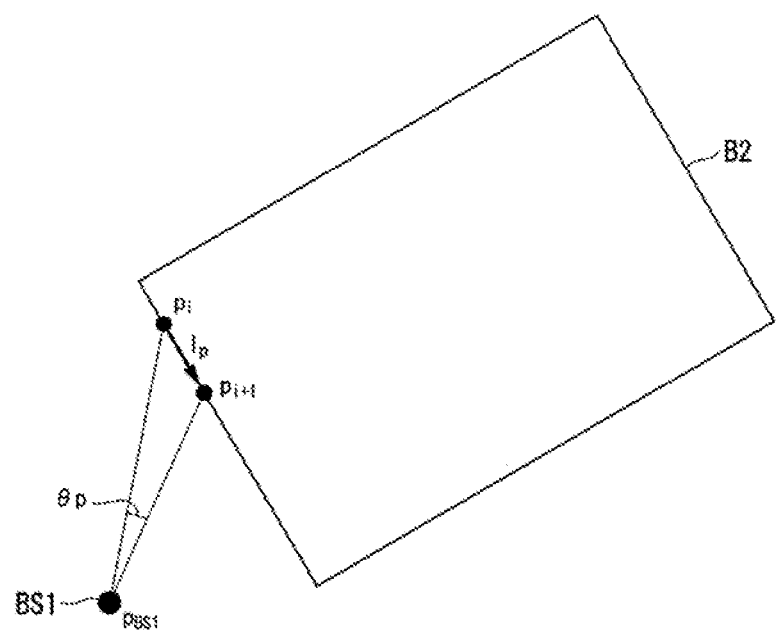
FIG. 5 is a diagram for illustrating a separation angle according to the fifth embodiment of the present invention.

Here, $p_i p_{SB1}$ (right arrow above) represents a vector starting from a point $p_i$ and ending at a point $p_{BS1}$. Also, for example, the above interval $l_p$ shown in FIG. 5 can be expressed as in the following equation (6).

[Math. 6]

$$l_p = |\overrightarrow{p_i p_{i+1}}| \quad (6)$$

Also, between the angle $\theta_b$ obtained by converting the width $l_b$ of the obstruction B3 into the angle viewed from the wireless base station BS1 and $\theta_p$ shown in the above-described equation (4), the same relationship as the relationship between the interval $l_p$ between the two adjacent installation candidate points $p_n$ and the width $l_b$ of the obstruction B3 shown in equation (1) in the above-described first embodiment is satisfied. That is, the relationship between $\theta_b$ and $\theta_p$ is expressed by the following equation (7).

[Math. 7]

$$\theta_p << \theta_b \quad (7)$$

As described above, in general, the width $l_b$ of the obstruction B3 is relatively quite large compared to the distance $l_p$ between two adjacent installation candidate points $p_n$. Therefore, if it has been determined that there is no line of sight between a certain installation candidate point $p_n$ and the wireless base station BS1, it can be said that there is a very high likelihood that it will similarly be determined that there is no line of sight also for another installation candidate point $p_n$ that is present at a position within the separation angle $\theta_p$ in a view from the wireless base station BS1.

Note that in general, the angle $\theta_b$ obtained by converting the width $l_b$ of the obstruction B3 into the angle viewed from the wireless base station BS1 is unknown, and in actuality, there may be cases where the angle $\theta_b$ is not necessarily much larger than the above angle $\theta_p$. However, in order to specify the angle $\theta_b$, it is easily expected that analysis of a large number of pieces of point cloud data will be required and a large amount of calculation time will be required.

Therefore, in the line-of-sight determination apparatus 1 according to the fifth embodiment, the angle $\theta_b$ is not specified, and any separation angle $\theta_q$ that satisfies the following equation (8) is defined.

[Math. 8]

$$\theta_p < \theta_q \tag{8}$$

As described above, the line-of-sight determination apparatus 1 in the fifth embodiment excludes another installation candidate point $p_n$ that is present at a position within the separation angle $\theta_q$ from the installation candidate point $p_n$ that has been determined as having no line of sight with the wireless base station BS1 from the targets to be subjected to the determination of whether or not there is a line of sight. That is, the line-of-sight determination apparatus 1 excludes another installation candidate point $p_n$ for which the angle between the installation candidate point $p_n$ that has been determined as having no line of sight and another installation candidate point $p_n$ as viewed from the position of the wireless base station BS1 is a predetermined angle (separation angle $\theta_q$) or less from the targets to be subjected to the determination of whether or not there is a line of sight. As a result, the line-of-sight determination apparatus 1 can reduce the number of instances of performing processing for determining whether or not there is a line of sight for the installation candidate point $p_n$, which is likely to be determined as having no line of sight.

Note that as described above, the line-of-sight determination apparatus 1 in the fifth embodiment has a configuration in which the separation angle $\theta_q$ is used instead of the separation distance $l_q$ as in the first embodiment described above as the value of the separation serving as a reference for determining whether or not to add, to the determination exclusion list, another installation position candidate of the wireless terminal station located in the vicinity of the installation position candidate of the wireless terminal station that has been determined as having no line of sight. Such a configuration in which the separation angle $\theta_q$ is used as a reference instead of the separation distance $l_q$ can be similarly applied to the second to fourth embodiments described above as well.

Sixth Embodiment

Hereinafter, a sixth embodiment of the present invention will be described.

In the above-described first embodiment, the line-of-sight determination apparatus 1 starts the processing for determining whether or not there is a line of sight from the installation candidate point $p_1$ located at the end portion of the building B2. Then, the line-of-sight determination apparatus 1 performs the determination of whether or not there is a line of sight in order starting from the installation candidate point $p_n$ that is closer to the installation candidate point $p_1$ while excluding installation candidate points $p_n$ included in the determination exclusion list from the determination targets. Then, in the above-described second embodiment and third embodiment, the line-of-sight determination apparatus 1 uses a value obtained based on the beam width and the Fresnel zone width as the value of the separation distance $l_q$, which is a reference for deciding whether or not to add, to the determination exclusion list, another installation position candidate of the wireless terminal station located in the vicinity of the installation position candidate of the wireless terminal station that has been determined as having no line of sight.

However, if the obstruction B3 is not a thin object such as a utility pole or a tree but a structure that is horizontally wide as a horizontally long building, there is a possibility that it may be continuously determined that there is no line of sight between the wireless base station BS1 and the installation candidate point $p_n$ even if a value obtained based on the beam width or the Fresnel zone width is used as the value of the separation distance $l_q$.

Figure 6:
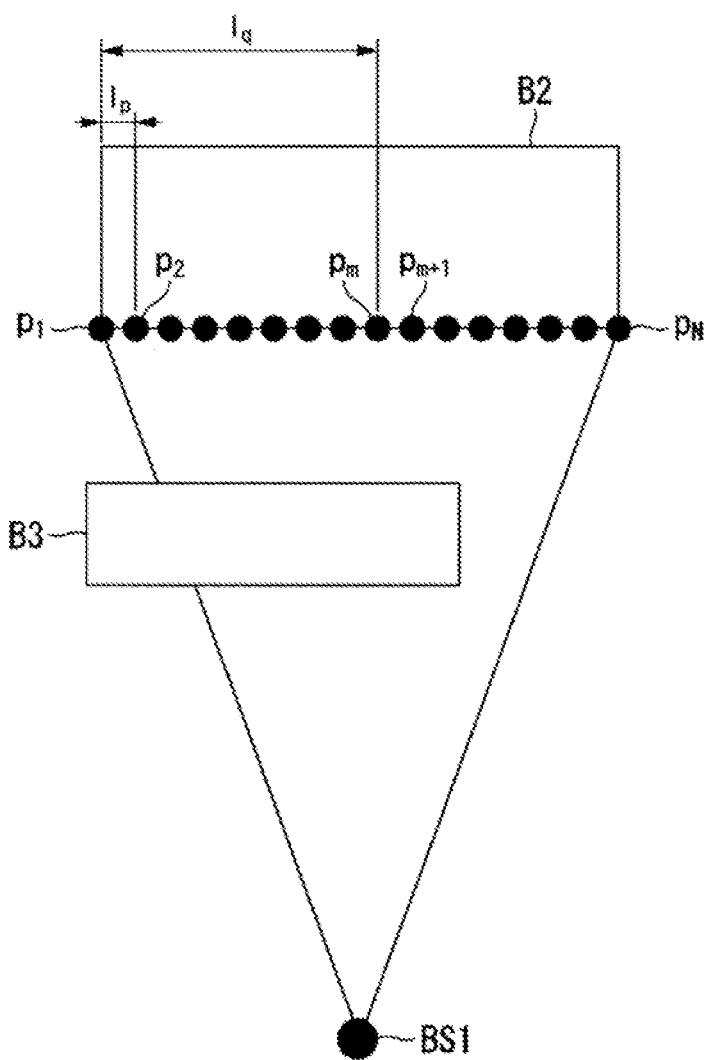
FIG. 6 is a schematic diagram showing line-of-sight determination performed by a line-of-sight determination apparatus according to a sixth embodiment of the present invention.

FIG. 6 is a schematic view showing the line-of-sight determination performed by the line-of-sight determination apparatus 1 according to the sixth embodiment of the present invention. In the present embodiment, as shown in FIG. 6, if the determination of whether or not there is a line of sight is performed for a plurality of installation candidate points $p_n$ (n=1, 2, . . . , N) of a certain building B2 (e.g., a wall surface or the like thereof), for example, the line-of-sight determination apparatus 1 performs the determination in the following order.

Similarly to the above-described first embodiment, the line-of-sight determination apparatus 1 in the present embodiment first determines whether or not there is a line of sight between the wireless base station BS1 and the installation candidate point $p_1$ on the leftmost end in the building B2. As shown in FIG. 6, there is an obstruction B3 between the wireless base station BS1 and the installation candidate point $p_1$. Accordingly, the line-of-sight determination apparatus 1 determines that there is no line of sight between the wireless base station BS1 and the installation candidate point $p_1$.

If it has been determined that there is no line of sight between the wireless base station BS1 and the installation candidate point $p_1$, the line-of-sight determination apparatus 1 assumes that there is no line of sight between the wireless base station BS1 and other installation candidate points $p_n$ (that is, the installation candidate point $p_2$ to the installation candidate point $p_m$) that are present at positions at which the distance from the installation candidate point $p_1$ is within the separation distance $l_q$, similarly to the above-described first embodiment.

Then, the line-of-sight determination apparatus 1 in the present embodiment does not select $p_{m+1}$ as the next installation candidate point $p_n$ that is a target to be subjected to the determination of whether or not there is a line of sight as in the above-described first embodiment, but selects the installation candidate point $p_N$ located at the opposite end (third second position), which is the position farthest from the installation candidate point $p_1$ that has been determined as having no line of sight.

Note that the subsequent operations of the line-of-sight determination apparatus 1 will be described in detail below with reference to the flowchart.

Operations of Line-of-Sight Determination Apparatus

Hereinafter, an example of operations of the line-of-sight determination apparatus 1 will be described.

Figure 7:
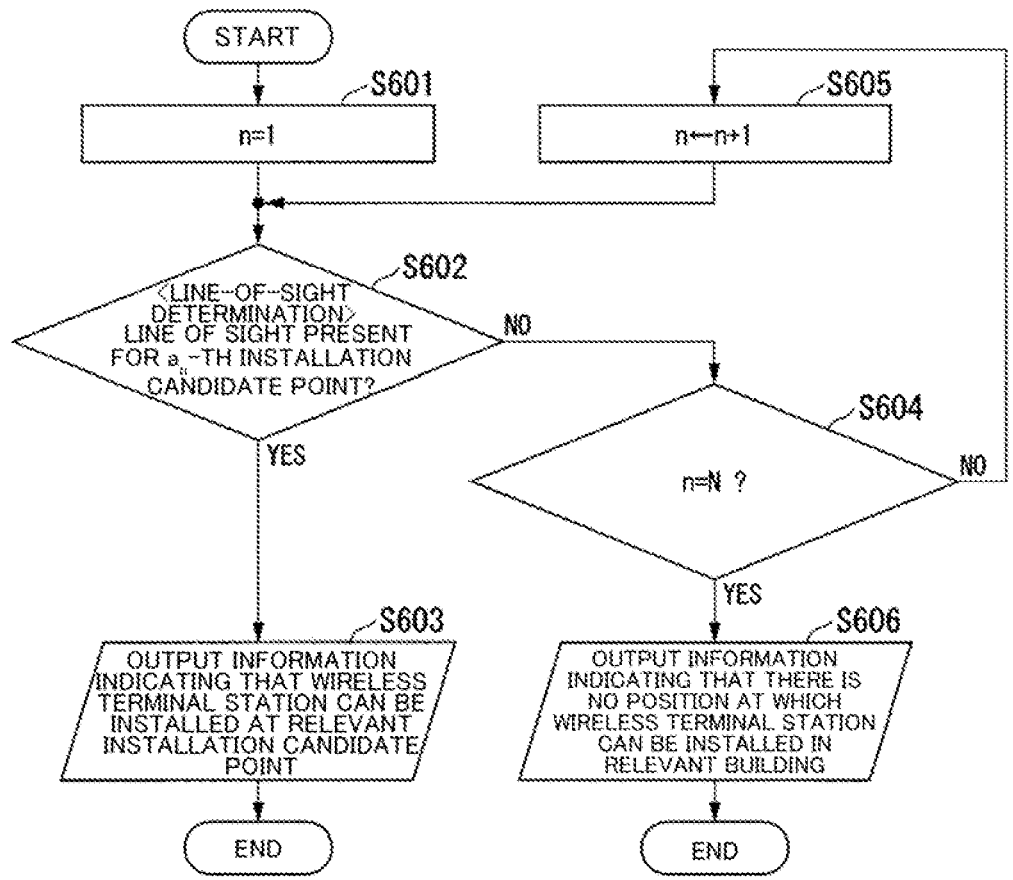
FIG. 7 is a flowchart showing operations of the line-of-sight determination apparatus according to the sixth embodiment of the present invention.

FIG. 7 is a flowchart showing operations of the line-of-sight determination apparatus 1 according to the sixth embodiment of the present invention.

The operations of the line-of-sight determination apparatus 1 shown in the flowchart of FIG. 7 are started when the point cloud data acquisition unit 11 acquires the point cloud data and stores the acquired point cloud data in the storage unit 16, and thereafter the installation candidate point selection unit 12 selects an installation position candidate of the wireless base station (position of the wireless base station BS1) and a building or the like (building B2), which are to be targets to be subjected to the determination of whether or not there is a line of sight. The point cloud data in this context is point cloud data including a plurality of installation position candidates of the wireless base station (positions of the wireless base station BS1) that are present within the range of the service provision area, and installation position candidates of a plurality of wireless terminal stations (each installation candidate point $p_n$ in each building B2) in a plurality of buildings (e.g., on a wall surface), similarly to the above-described first embodiment.

Note that here, as shown in FIG. 6, it is assumed that N installation candidate points $p_n$ (in order from $p_1$ to $p_N$) are aligned in a horizontal row on the building B2. Also, it is assumed that the installation candidate point $p_1$ is located at one end portion (e.g., the left end in FIG. 6) of the building B2. Also, it is assumed that the installation candidate point $p_N$ is located at the other end portion (e.g., the right end in FIG. 6) of the building B2, which is the farthest from the position of the installation candidate point $p_1$.

First, the installation candidate point selection unit 12 of the line-of-sight determination apparatus 1 substitutes 1 for n, which is a variable that identifies the installation candidate point $p_n$ (n=1) (step S601). Note that the value of the variable is temporarily stored in, for example, the storage unit 16 or the like. Next, the line-of-sight determination unit 13 determines whether or not there is a line of sight between the position of the wireless base station BS1 and the $a_n$-th installation candidate point $p_{an}$ that satisfies the following equation (9) (step S602).

[Math. 9]

$$a_n = \begin{cases} \dfrac{n}{2} + \dfrac{1}{2} & \text{(if } n \text{ is odd)} \\ N - \dfrac{n}{2} + 1 & \text{(if } n \text{ is even)} \end{cases} \quad (9)$$

If it has been determined by the line-of-sight determination unit 13 that there is a line of sight between the position of the wireless base station BS1 and the $a_n$-th installation candidate point $p_{an}$ (step S602, Yes), the determination result output unit 15 outputs information indicating that the wireless terminal station can be installed at the installation candidate point $p_{an}$ (step S603), and the operations of the line-of-sight determination apparatus 1 shown in the flowchart of FIG. 7 end. That is, a determination result is output which indicates that there is a line of sight between the position of the selected wireless base station BS1 and the building B2.

On the other hand, if it has been determined by the line-of-sight determination unit 13 that there is no line of sight between the position of the wireless base station BS1 and the installation candidate point $p_1$ (step S602, No), the installation candidate point selection unit 12 checks whether or not n=N is satisfied (step S604). If n=N is not satisfied (i.e., if n=N is satisfied) (step S604, No), the installation candidate point selection unit 12 adds 1 to the value of n (n←n+1) (step S605). Then, the line-of-sight determination unit 13 repeats the operations of step S602 and onward once again.

On the other hand, if n=N is satisfied (step S604, Yes), it is determined that there is no line of sight between the position of the wireless base station BS1 and all of the installation candidate points $p_n$ of the building B2. In this case, the determination result output unit 15 outputs information indicating that there is no position where the wireless terminal station can be installed in the building B2 that is a target to be subjected to the determination of whether or not there is a line of sight (step S606), and the operations of the line-of-sight determination apparatus 1 shown in the flowchart of FIG. 7 end. That is, a determination result is output which indicates that there is no line of sight between the position of the selected wireless base station BS1 and the building B2.

Note that in order to simplify the description, the flowchart shown in FIG. 7 omits description of a configuration in which information indicating other installation candidate points $p_n$ located in the vicinity of the installation candidate point $p_n$ that has been determined as having no line of sight is added to the determination exclusion list, and the other installation candidate points $p_n$ are excluded from the targets to be subjected to the determination of whether or not there is a line of sight. However, it is of course possible to apply the configuration in this embodiment as well, similarly to the above-described embodiments.

Also, in the present embodiment, as indicated by the above equation (9), if the installation candidate point $p_n$ has been determined as having no line of sight even once, another installation candidate point $p_n$ located on the opposite side of (at a position farther away from) the installation candidate point $p_n$ on the building B2 is selected as the next target to be subjected to the determination of whether or not there is a line of sight. However, the present invention is not limited to such a configuration, and for example, a configuration is also possible in which the line-of-sight determination apparatus 1 starts the determination of whether or not there is a line of sight from one side of the wall surface of the building B2, and at a timing when it is repeatedly determined at predetermined number of times that there is no line of sight between the installation position candidate of the wireless terminal station and the installation position candidate of the wireless base station, performs switching such that the determination of whether or not there is a line of sight is performed from the other side (opposite side) this time.

As described above, the line-of-sight determination apparatus 1 according to each embodiment of the present invention described above uses point cloud data to determine whether or not there is a line of sight between installation position candidates of two opposing wireless stations. In determining whether or not there is a line of sight, if it is determined that there is no line of sight in a certain installation position candidate, there is a high likelihood that it will be determined that there is no line of sight also for another installation position candidate located in the vicinity of the installation position candidate. For this reason, when an installation position candidate that is the next target to be subjected to the determination of whether or not there is a line of sight is selected, the line-of-sight determination apparatus 1 selects from other installation position candidates excluding the installation position candidates located within a predetermined distance (e.g., the separation distance or separation angle) from the installation position candidate that has been determined as having no line of sight.

By providing such a configuration, the line-of-sight determination apparatus 1 in each embodiment of the present invention described above can further suppress the probability of selecting an installation position candidate that will be determined as having no line of sight. As a result, the line-of-sight determination apparatus 1 can improve the efficiency of determining of whether or not there is a line of sight between the installation position candidates of the two opposing wireless stations.

The line-of-sight determination apparatus 1 according to the above-described embodiment may also be realized by a computer. In this case, a program for realizing this function may be recorded on a computer-readable recording medium, and the program recorded on the recording medium may be read by the computer system and executed. Note that it is assumed that the term "computer system" as used herein includes an OS and hardware of peripheral devices. Also, "computer-readable recording medium" refers to a portable medium such as a flexible disk, a magneto-optical disk, a ROM, or a CD-ROM, or a recording device such as a hard disk built in a computer system. Furthermore, a "computer-readable recording medium" may also include a recording medium in which a program is held dynamically for a short amount of time, such as a communication line in the case of transmitting a program via a network such as the Internet or a communication line such as a telephone line, and a recording medium in which a program is held for a certain period of time, such as a volatile memory inside a computer system that serves as a server or a client in that case. Also, the above-described program may be for realizing part of the above-described functions, and the above-described functions may be further realized in combination with a program already recorded in the computer system, and may be realized using a programmable logic device such as an FPGA (Field Programmable Gate Array).

Although an embodiment of the present invention has been described above in detail with reference to the drawings, the specific configuration is not limited to this embodiment, and designs and the like that do not depart from the gist of the present invention are also encompassed therein.

REFERENCE SIGNS LIST

1 Line-of-sight determination apparatus
11 Point cloud data acquisition unit
12 Installation candidate point selection unit
13 Determination unit
14 Determination exclusion list update unit
15 Determination result output unit
16 Storage unit

The invention claimed is:

1. A line-of-sight determination method comprising:
a point cloud data acquisition step of acquiring point cloud data including a first position indicating a position of a first wireless station and a plurality of second positions indicating positions on a structure serving as a candidate in which a second wireless station opposing the first wireless station is to be installed; and
a line-of-sight determination step of determining whether or not there is a line of sight between the first position and at least one of the second positions, and determining whether or not there is a line of sight between the first wireless station and the structure based on the determination result,
wherein in the line-of-sight determination step, in response to a determination that there is no line of sight between the first position and a first second position among the second positions, it is not determined whether or not there is a line of sight between the first position and a second second position among the second positions, the second second position being located in the vicinity of the first second position.

2. The line-of-sight determination method according to claim 1, wherein a distance between the first second position and the second second position is a distance based on a beam width of an electromagnetic wave emitted in wireless communication between the first wireless station and the second wireless station.

3. The line-of-sight determination method according to claim 1, wherein a distance between the first second position and the second second position is a distance based on a size of a Fresnel zone of an electromagnetic wave emitted in wireless communication between the first wireless station and the second wireless station.

4. The line-of-sight determination method according to claim 1, wherein a distance between the first second position and the second second position is a distance based on a size of an object located between the first wireless station and the structure.

5. The line-of-sight determination method according to claim 1, wherein an angle between the first second position and the second second position at the first position is a predetermined angle or less.

6. The line-of-sight determination method according to claim 1, wherein in the line-of-sight determination step, in response to a determination that there is no line of sight between the first position and the first second position, subsequently, it is determined whether or not there is a line of sight between the first position and a third second position among the second positions, the third second position being located the farthest from the first second position among the second positions.

7. A line-of-sight determination apparatus comprising:
a processor; and
a storage medium having computer program instructions stored thereon, when executed by the processor, perform to:
acquire point cloud data including a first position indicating a position of a first wireless station and a plurality of second positions indicating positions on a structure serving as a candidate in which a second wireless station opposing the first wireless station is to be installed; and
determine whether or not there is a line of sight between the first position and at least one of the second positions, and determine whether or not there is a line of sight between the first wireless station and the structure based on the determination result,
wherein in response to a determination that there is no line of sight between the first position and a first second position among the second positions, does not determine whether or not there is a line of sight between the first position and a second second position among the second positions, the second second position being located in the vicinity of the first second position.

8. A non-transitory computer-readable medium having computer-executable instructions that, upon execution of the instructions by a processor of a computer, cause the computer to function as the line-of-sight determination method according to claim 1.

* * * * *